(12) United States Patent  (10) Patent No.: US 8,764,111 B2
Foelster et al.  (45) Date of Patent: Jul. 1, 2014

(54) HEIGHT ADJUSTMENT DEVICE FOR A VEHICLE SEAT

(75) Inventors: Thomas Foelster, Grafenau (DE); Dirk Kirchner, Sindelfingen (DE); Stephan Kuenzel, Moessingen (DE)

(73) Assignee: Daimler AG, Stuttgart (DE)

( * ) Notice: Subject to any disclaimer, the term of this patent is extended or adjusted under 35 U.S.C. 154(b) by 233 days.

(21) Appl. No.: 13/379,150

(22) PCT Filed: Jun. 17, 2010

(86) PCT No.: PCT/EP2010/003638
§ 371 (c)(1),
(2), (4) Date: Apr. 3, 2012

(87) PCT Pub. No.: WO2010/145823
PCT Pub. Date: Dec. 23, 2010

(65) Prior Publication Data
US 2012/0187735 A1 Jul. 26, 2012

(30) Foreign Application Priority Data
Jun. 20, 2009 (DE) .......................... 10 2009 025 694

(51) Int. Cl.
*A47C 1/00* (2006.01)
(52) U.S. Cl.
USPC ................................ 297/344.17; 297/344.15
(58) Field of Classification Search
USPC ........................... 297/344.17, 344.12, 344.15
See application file for complete search history.

(56) References Cited

U.S. PATENT DOCUMENTS

| 3,697,128 | A |   | 10/1972 | Strien et al. |
| 6,076,887 | A | * | 6/2000 | Andersson ................. 297/216.1 |
| 6,116,689 | A |   | 9/2000 | Bauer et al. |
| 6,406,092 | B1 | * | 6/2002 | Cordes et al. ............ 297/216.16 |
| 6,490,942 | B1 | * | 12/2002 | Meyer .......................... 74/89.37 |
| 6,517,157 | B1 | * | 2/2003 | Vorac ....................... 297/344.13 |
| 6,666,508 | B1 | * | 12/2003 | Hofmann et al. .......... 297/216.1 |
| 6,755,469 | B2 | * | 6/2004 | Akaike et al. ............ 297/344.15 |
| 6,843,460 | B2 | * | 1/2005 | Koga et al. ..................... 248/421 |
| 6,851,753 | B2 | * | 2/2005 | Akaike et al. ............ 297/344.17 |
| 7,066,540 | B2 | * | 6/2006 | Minai et al. .............. 297/344.15 |
| 7,300,108 | B2 | * | 11/2007 | Canteleux ................ 297/344.15 |
| 7,314,249 | B2 | * | 1/2008 | Becker et al. ............ 297/344.15 |

(Continued)

FOREIGN PATENT DOCUMENTS

DE   1 904 687       9/1970
DE   31 30 280 A1    2/1983

(Continued)

OTHER PUBLICATIONS

PCT/ISA/237 Form (Seven (7) pages).

(Continued)

*Primary Examiner* — Jose V Chen
(74) *Attorney, Agent, or Firm* — Crowell & Moring LLP

(57) ABSTRACT

A height adjustment mechanism for a vehicle seat includes an adjustment parallelogram. The adjustment parallelogram includes a seat frame part, an upper rail and lateral links connecting the seat frame part and the upper rail. A spindle drive can adjust the adjustment parallelogram such that a distance between the seat frame part and the upper rail is changed by changing a length of the spindle drive. The spindle drive connects two obliquely opposing corners of the adjustment parallelogram (1) together in a reinforcing manner.

10 Claims, 2 Drawing Sheets

(56) References Cited

U.S. PATENT DOCUMENTS

Figure 1:
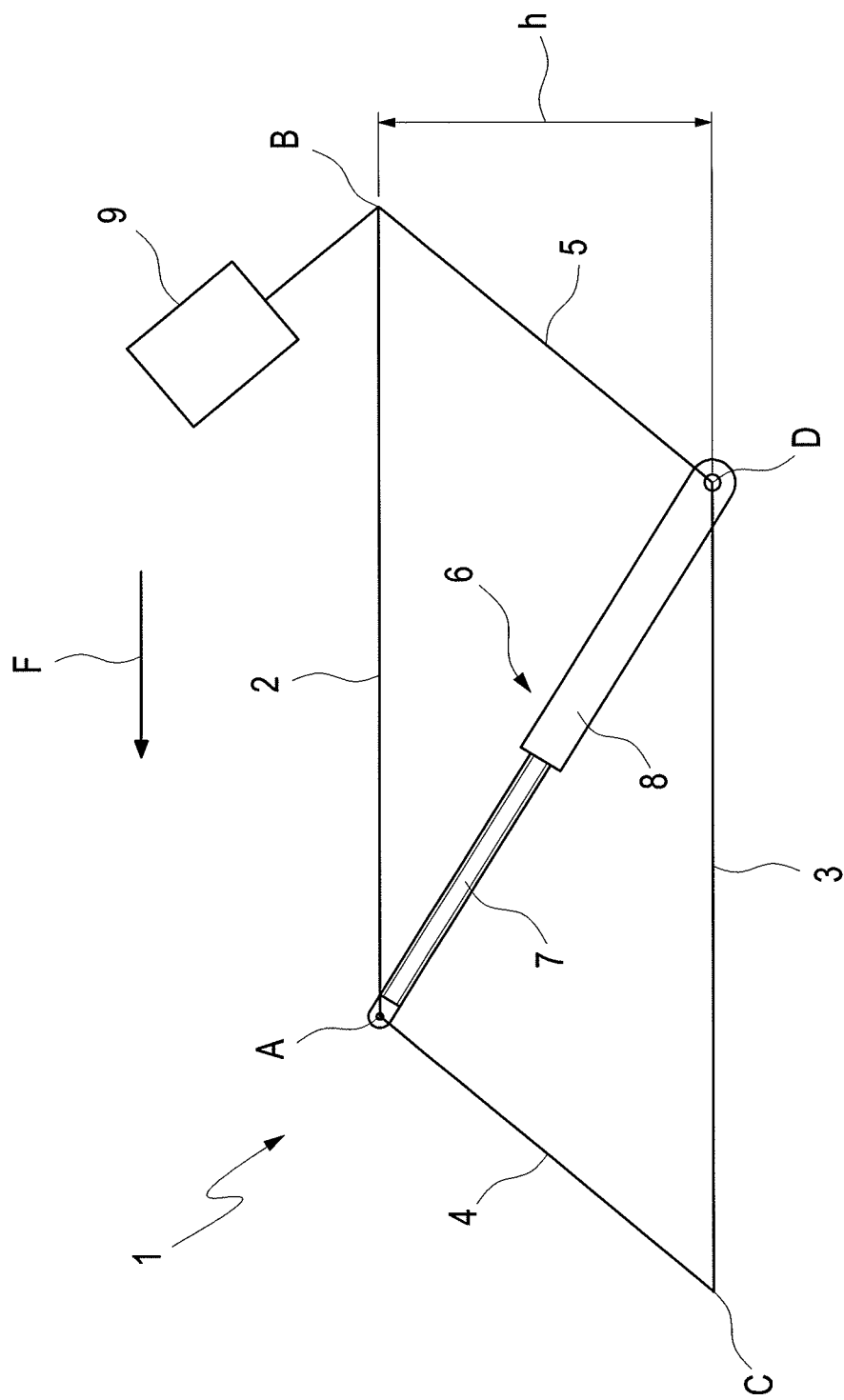

| | | | |
|---|---|---|---|
| 7,770,863 B2* | 8/2010 | Yamada et al. | 248/429 |
| 2008/0179932 A1 | 7/2008 | Becker et al. | |
| 2010/0096895 A1* | 4/2010 | Nonomiya | 297/344.15 |
| 2011/0163585 A1* | 7/2011 | Beneker et al. | 297/344.15 |

FOREIGN PATENT DOCUMENTS

| | | |
|---|---|---|
| DE | 36 36 786 A1 | 5/1988 |
| DE | 36 43 729 A1 | 7/1988 |
| DE | 198 58 980 C1 | 5/2000 |
| DE | 203 06 680 U1 | 7/2004 |
| DE | 43 02 329 B4 | 8/2005 |
| DE | 197 40 043 B4 | 2/2007 |
| EP | 1 122 118 A1 | 8/2001 |
| FR | 2 904 272 A1 | 2/2008 |
| FR | 2 911 822 A1 | 8/2008 |
| GB | 2 018 583 A | 10/1979 |
| GB | 2 106 778 A | 4/1983 |

OTHER PUBLICATIONS

International Search Report including English language translation dated Sep. 30, 2010 (Eight (8) pages).

* cited by examiner

HEIGHT ADJUSTMENT DEVICE FOR A VEHICLE SEAT

BACKGROUND AND SUMMARY OF THE INVENTION

The invention relates to a height adjustment device for a vehicle seat.

In order to better protect a vehicle occupant in the event of an accident, the occupant can belt himself in with a seatbelt. A conventional seatbelt is connected to the vehicle at at least two points. Three connection points between the seatbelt and vehicle are conventional, with a belt buckle for closing and opening the seatbelt being is in the region of one connection point. In the event of an accident, considerably increased forces may act on the connection points.

In modern vehicles, height adjustable seats, where the distance of a seat shell, on which the occupant can sit, from a vehicle floor can be adjusted by a height adjustment device, are conventional. It is advantageous for the occupants of these height adjustable seats if the belt buckle is fastened in the region of the height adjustable seat shell and follows the movements of the seat shell instead of being fastened to the vehicle floor. In such case, the belt buckle, independently of the set height of the seat shell, is at the same distance from an occupant sitting on the seat shell, which is not the case for a belt buckle fastened to the vehicle floor. In the case of a belt buckle provided in the region of a height adjustable seat shell, the force introduced via the belt buckle in the event of an accident has to be transmitted to the vehicle floor via the height adjustment device. The height adjustment device must be able to withstand this load, which is greatly increased by the accident. This can be achieved in conventional solutions by providing an additional component as force transmitting element in the force transmission path of the height adjustment device owing to the tensile force of the belt buckle in the event of an accident. This increases the load bearing ability of the height adjustment device. However, the additional component is required.

A height adjustment device for motor vehicle seats is known from German Patent Document DE 43 02 329 B4, in which the seat part can be raised and lowered relative to the vehicle floor by means of pivot supports that are articulated in the region of each seat corner and are connected together in pairs via pivot shafts. A single spindle mechanism serves for infinitely adjustable height adjustment of the seat part. A blocking device is locked or released as required via a lever mechanism linked to the height adjustment. The height adjustment device should also withstand a crash load.

German Patent Document DE 197 40 043 B4 describes a vehicle seat with a belt buckle of a seatbelt and with a height adjustable underframe on which a seat support is arranged. The height adjustable underframe has rear and front pivot supports that are articulated in each case to a pivot articulation on the seat support. The belt buckle is associated with the seat support. A blocking device is formed on the height adjustable underframe, which device, in the event of tension on the belt buckle due to an accident, is intended to reduce alteration of the height adjustable underframe that can occur due to the accident. The blocking device comprises the additional component mentioned above, which is included as force transmitting element in the force transmission path of the height adjustable underframe as height adjustment device.

A height adjustment device for seats is described in German Patent Document DE 31 30 280 A1, in which the seat part, by means of pivot supports arranged in the region of each seat corner and connected together in pairs via pivot shafts, can be raised and lowered relative to the vehicle floor by means of an adjustment device associated with each pivot shaft. A linearly extendable adjustment element as an adjustment device is mounted at one end pivotably on the one pivot shaft and is articulated at the other end to a pivot lever, which is connected in rotation resistant manner to the other pivot shaft.

A height adjustment device for seats with front and rear lever arms fastened in rotatable manner between a seat frame and a base is known from British Patent Document GB 2 018 583 A. A rod connects the one lever to the other one, the rod being fastened to one of the levers via a connecting element. The connecting element can be adjusted between two states. In one state, the rod can slide through the connecting element, so that the distance between the seat frame and the base can be changed. In the other state, the rod is connected securely to the connecting element, so that the distance between the seat frame and the base is fixed.

German Patent Document DE 36 36 786 A1 describes a height adjustment device for seats having a seat part that can be raised and lowered relative to the vehicle floor by means of pivot supports arranged in the region of each seat corner via an adjusting device. This adjusting device comprises a threaded spindle arranged in stationary manner in the axial direction in a mounting on the bearing body of the pivot supports, but is rotatable, which threaded spindle engages with its setting thread in a spindle nut associated with the adjustment arm of a pivot support. In order to be able to connect the spindle nut seated on the threaded spindle to the adjustment arm of the pivot support directly without the aid of intermediate members, the mounting that receives the threaded spindle in stationary manner in the axial direction is formed as a cardan-type mounting.

German Patent Document DE 203 06 680 U1 describes a device for locking an adjustment device of a vehicle seat in the event of an accident. The vehicle seat has, in addition to an adjustment device, a pretensioning device for pretensioning a seatbelt in the event of an accident. The pretensioning device is coupled with a first locking element such that triggering of the pretensioning device brings this first locking element into engagement with a second locking element, which locks the adjustment device. In this case, the seatbelt is coupled with the first locking element in such a manner that the belt force occurring in the event of an accident and when the pretensioning device is not triggered or is insufficiently triggered likewise brings the first locking element into engagement with the second locking element.

Exemplary embodiments of the present invention are directed to providing a height adjustment device for a vehicle seat that also withstands an increased load in the event of an accident.

A height adjustment device in accordance with the present invention comprises an adjustment parallelogram, which consists substantially of a seat frame part, an upper rail and lateral links. The lateral links connect the seat frame part and the upper rail in rotary articulated manner. A spindle drive can adjust the adjustment parallelogram indirectly or directly such that a distance between the seat frame part and the upper rail is changed by changing a length of the spindle drive.

The adjustment parallelogram forms part of a seat structure for a vehicle seat. In a conventional embodiment, the adjustment parallelogram is connected to a second adjustment parallelogram via one or more transverse tubes. In one embodiment a spindle drive may be omitted from the second adjustment parallelogram. Above the seat frame parts of the two adjustment parallelograms and the transverse tube or tubes there is usually a seat shell on which an occupant can sit.

In conventional embodiments, the upper rails of the two adjustment parallelograms are mounted displaceably on lower rails fastened to a vehicle floor. This permits longitudinal adjustment of the vehicle seat along the lower rail. Further parts of the vehicle seat, such as, for example, a backrest are not crucial for the proposed solution, and will therefore not be explained further here.

A particular rigidity of the proposed height adjustment device is achieved in that the spindle drive connects together two obliquely opposing corners of the adjustment parallelogram in reinforcing manner. The connection can be carried out indirectly or directly. "Reinforcing" indicates here that the adjustment parallelogram with the spindle drive is capable of transmitting a greater force—introduced via an upper region of the adjustment parallelogram perpendicular to or in the direction of a longitudinal extent of the seat frame part—to the upper rail than would be the case without the spindle drive. In this case, no additional blocking device, which can obstruct a movement of the adjustment parallelogram, for example, due to a pivoting movement linked to the height adjustment, is required. Different embodiments may differ from each other, for example, by different points of articulation of the spindle drive to the adjustment parallelogram. Advantageous embodiments are distinguished in particular in that a distance between the seat frame part and upper rail substantially does not change upon the transmission of a force introduced as above in the case of an accident.

No change, or as small as possible a change, in the distance between the seat frame part and upper rail in the case of an accident is important, particularly when a belt buckle is attached in the upper region of the adjustment parallelogram, via which buckle an increased force as described above can be transmitted to the upper rail in the event of an accident. The more rigid the adjustment parallelogram, the more quickly can a counter force, which is necessary for restraining the occupant by means of the seatbelt, be built up in the case of an accident. The earlier the occupant is restrained by the seatbelt, the better can loads which are due to an accident be reduced for the occupant, since the occupant participates earlier in the vehicle deceleration due to an accident. The adjustment parallelogram, the spindle drive and the attachment of the belt buckle thereto have to be designed in terms of their load bearing ability for forces, which usually occur maximally in this region in the event of an accident. This means that the spindle drive has to be capable of bearing high loads, which, as described in the example of embodiment, applies in particular for tensile loading. The tensile loading acts in a direction in which the spindle drive would be extended, i.e. lengthened. A spindle drive capable of bearing high loads can, for example, be constituted by the use of at least one high strength material, or alternatively or in addition by larger dimensions of the load bearing components of the spindle drive, with sufficient tensile strength of the spindle drive having to be taken into account. In the spindle drive of the height adjustment device described in German Patent Document DE 43 02 329 B4, merely pressure loading of the spindle drive by the mass of the motor vehicle seat can be achieved. The pressure loading acts in a direction in which the spindle drive would be compressed, i.e., shortened. Linking of the height adjustment with the belt buckle is moreover not described in German Patent Document DE 43 02 329 B4.

In the event of an accident, the spindle drive must also not substantially twist, which would change its length. This can be ensured, for example, by a suitably flat pitch of the thread, taking into account frictional forces which act upon the adjustment. Common accidents are, for example, recreated by known crash tests, which crash tests and the imitation thereof in computer aided simulations can be used for designing the height adjustment.

Without departing from the scope of the solution in accordance with the proposal, further elements may be added to the adjustment parallelogram, as long as they do not appreciably impair the rigidity of the adjustment parallelogram. Further elements may for example be levers, deflectors, connecting parts, fittings or similar components.

Instead of a spindle drive, other embodiments of a rod type adjuster may also be used. A rod type adjuster is distinguished by a changeable length. Among other things, a piston drive, such as, for example, a hydraulic or a pneumatic piston, may be used. Likewise, mechanical or electromechanical thrust elements are possible. The constituents of the adjustment parallelogram and adjoining components serve, in particular, for mechanical strength in the context of the present invention. These constituents may also be otherwise named and embodied in this context.

BRIEF DESCRIPTION OF THE DRAWING FIGURES

Figure 2:
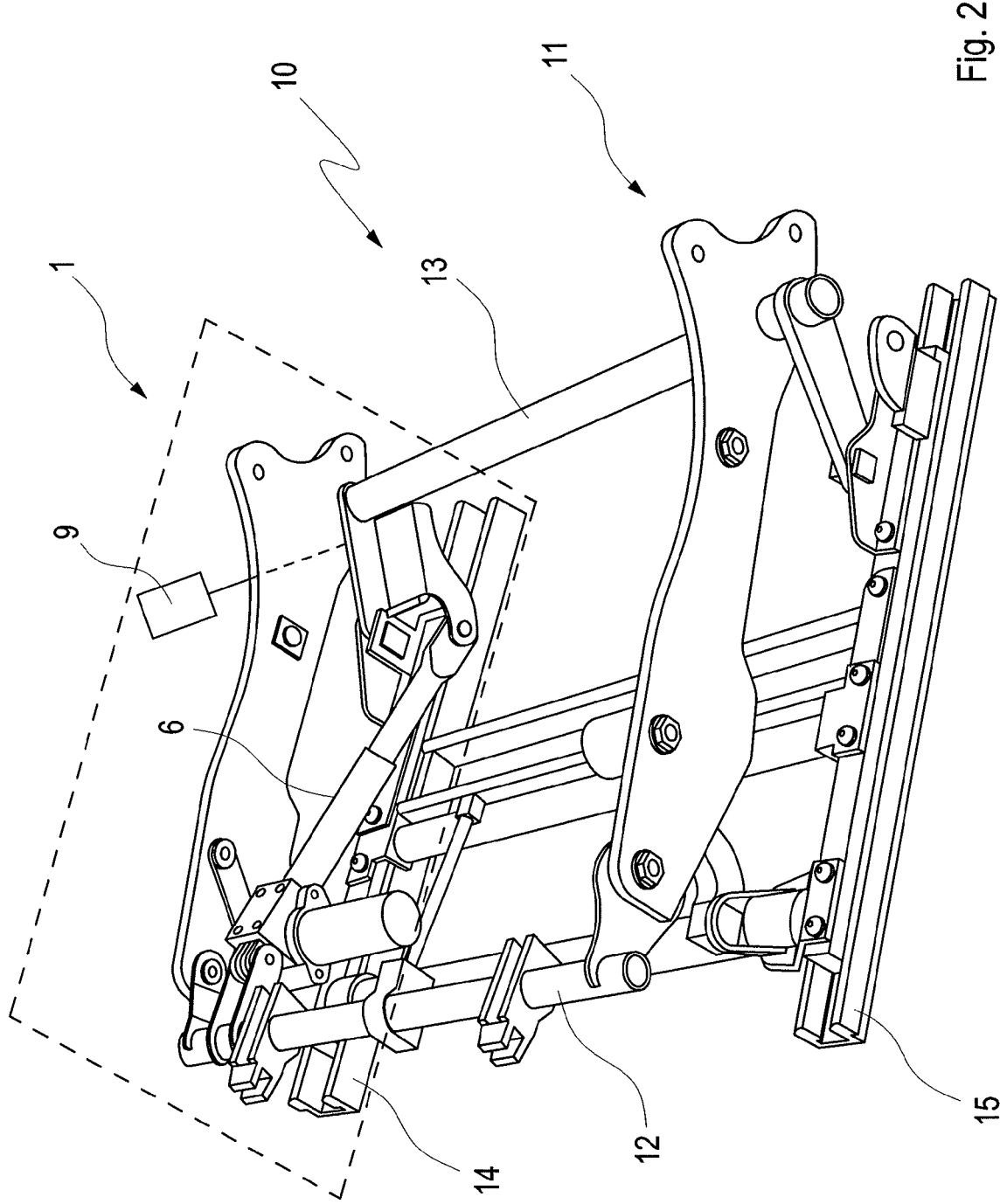

An embodiment of the present invention will be described in exemplary manner with reference to the drawings.
Therein:
FIG. 1 shows a diagrammatic representation of the adjustment parallelogram;
FIG. 2 shows the seat structure.

DETAILED DESCRIPTION

FIG. 1 shows the adjustment parallelogram 1 diagrammatically in order to illustrate the principle of construction more clearly. The seat frame part 2, the upper rail 3, a first lateral link 4 and a second lateral link 5 are shown as basic components of the adjustment parallelogram 1. The seat frame part 2 and upper rail 3 are connected together in rotary articulated manner by the two lateral links 4, 5 at the corners A, B, C, D of the parallelogram.

The spindle drive 6 connects two obliquely opposing corners A, D, and consists of a threaded rod 7 and a threaded sleeve 8. The threaded rod 7 is attached pivotably to the corner A, and is axially rotatable about its longitudinal axis. The threaded sleeve 8 is attached pivotably to the corner D. The threaded rod 7 can be turned in a known manner, for example, by an electric motor (not shown in the drawing), or by a mechanical rotary wheel (likewise not shown in the drawing). The threaded rod 7 engages with its thread in a threaded sleeve 8 with a mating thread. Upon turning the threaded rod 7, the length of the spindle drive 6 shortens or lengthens in known manner corresponding to the direction of turning of the threaded rod 7. This changes the distance between the corners A and D of the adjustment parallelogram, which due to the rotary articulated connection of all four corners A, B, C, D results in a change in the distance h between the seat frame part 2 and the upper rail 3.

If the threaded rod 7 of the spindle drive 6 is not turned, the length of the spindle drive remains unchanged. Owing to a positive or nonpositive connection between the threaded rod 7 and the threaded sleeve 8 which is sufficient for loads that occur, the length of the spindle drive 6 can continue to be unchanged even under the action of compressive or tensile force on the spindle drive 6. A corresponding connection can be brought about, for example, by a sufficiently flat thread pitch of the threaded rod 7 linked to a sufficiently high friction between the threaded rod 7 and the threaded sleeve 8.

In the upper region of the adjustment parallelogram 1, a belt buckle 9 is provided at the corner B. Through a seatbelt, not shown here, inserted in the belt buckle 9, considerably increased forces in the event of an accident can be introduced into the adjustment parallelogram, which is intended to transmit the introduced forces on via the upper rail in the direction of the vehicle floor. An introduction of force can take place, for example, in the event of a head-on collision in the direction of the arrow marked F. A direction pointing obliquely upwards due to an additional vertical constituent is also possible. If a force with one of the two directions described by way of example is introduced via the belt buckle, a tractive force acts on the spindle drive 6. Since the spindle drive 6, owing to its configuration described above, does not, or does not substantially, change its length, it can reinforce the adjustment parallelogram 1 owing to its attachment in accordance with the present invention. This means that the adjustment parallelogram 1 can transmit a greater force than would be possible without the spindle drive 6 attached in accordance with the present invention. The adjustment parallelogram 1 diagrammatically illustrated in FIG. 1 is shown in FIG. 2 as it may appear in a practical embodiment. In order that the position of the adjustment parallelogram 1 within the seat structure 10 becomes clearer, it is illustrated in FIG. 2 together with the seat structure 10. In order for the illustration to remain clear, only a part of a vehicle seat that is essential for the solution in accordance with the proposal is shown as seat structure 10. The adjustment parallelogram 1 is outlined in broken lines and forms part of the seat structure 10 for the vehicle seat.

The adjustment parallelogram 1 is connected to a second adjustment parallelogram 11 by means of a front transverse tube 12 and a rear transverse tube 13. Above the transverse tubes 12, 13 there is usually a cushioned seat shell, not shown here, on which the occupant can sit.

The upper rails 3 of the two adjustment parallelograms 1, 11 are mounted displaceably on the lower rails 14, 15. This permits longitudinal adjustment of the vehicle seat along the lower rails 14, 15. The lower rails 14, 15 are fastened to the vehicle floor, not shown in FIG. 2.

In other words, the invention can be described as follows:

Due to the adjustment of the height adjustment, in the first row of seats, normally the belt buckle remains rigid in a perpendicular Z-direction. Current Mercedes vehicles equipped with what is called an SCSI seat structure have a belt buckle which co-moves upwards. For this, however, a restraining device called a "crash locking mechanism" is necessary in the seat in the event of an accident, which means reduces a movement of the belt buckle relative to the vehicle body.

Due to the invention, the "crash locking mechanism" restraining device becomes superfluous owing to an optimized arrangement of the spindle drive already present. Due to the positioning of a spindle drive on the tunnel side of the seat height adjustment, this drive can take up the belt forces of the belt buckle which is likewise on the tunnel side. This is achieved in that the spindle drive is optimally incorporated in the flow of force.

The invention permits a belt buckle which co-moves upwards, and thus optimum belt usage comfort in any sitting position. The new principle of the optimized arrangement of the spindle drive as a vertical adjuster drive makes it possible to save on the "crash locking mechanism" restraining system within the seat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A height adjustment device for a vehicle seat, comprising:
   an adjustment parallelogram consisting essentially of
      a seat frame part;
      an upper rail; and
      lateral links connecting the seat frame part and the upper rail,
   a spindle drive configured to adjust the adjustment parallelogram such that a distance between the seat frame part and the upper rail is changed by changing a length of the spindle drive,
   wherein the spindle drive is coupled between two obliquely opposing corners of the adjustment parallelogram in such a manner that a force introduced in an upper region of the adjustment parallelogram is transmitted to the upper rail, and the spindle drive is configured to reinforce the adjustment parallelogram, and the spindle drive is configured to bear high tensile loads so that it withstands forces occurring during an accident.

2. The height adjustment device as claimed in claim 1, wherein the transmission of the force introduced via the upper region of the adjustment parallelogram to the upper rail occurs without a significant change in the distance.

3. The height adjustment device as claimed in claim 2, wherein a belt buckle is attached indirectly to the adjustment parallelogram, and the height adjustment device is configured to introduce the force via the belt buckle.

4. The height adjustment device as claimed in claim 2, wherein a belt buckle is attached directly to the adjustment parallelogram, and the height adjustment device is configured to introduce the force via the belt buckle.

5. The height adjustment device as claimed in claim 2, wherein a size of a maximum force transmittable via the adjustment parallelogram corresponds to at least an order of magnitude of forces occurring on a belt buckle during an accident.

6. The height adjustment device of claim 1, wherein the adjustment parallelogram further essentially consists of levers, deflectors, connecting parts, or fittings.

7. The height adjustment device of claim 1, wherein the spindle drive is arranged on a side of the vehicle seat on which a belt buckle is directly or indirectly attached to the adjustment parallelogram.

8. The height adjustment device of claim 1, further comprising:
   a second adjustment parallelogram consisting essentially of
      a seat frame part;
      an upper rail; and
      lateral links connecting the seat frame part and the upper rail,
   wherein the adjustment parallelogram and the second adjustment parallelogram are coupled via front and rear transverse connectors.

9. The height adjustment device of claim 8, wherein the spindle drive is coupled to the adjustment parallelogram and the second adjustment parallelogram via the front and rear transverse connectors.

10. The height adjustment device of claim 9, wherein the spindle drive is arranged on a side of the vehicle seat on which a belt buckle is directly or indirectly attached to the adjustment parallelogram.

* * * * *